United States Patent
Falkenberg et al.

(10) Patent No.: US 9,068,106 B1
(45) Date of Patent: Jun. 30, 2015

(54) DUST SUPPRESSION COMPOSITION AND METHOD OF CONTROLLING DUST

(71) Applicant: Soilworks, LLC, Chandler, AZ (US)

(72) Inventors: Chad Edward Falkenberg, Paradise Valley, AZ (US); Dorian Amber Lorrayne Falkenberg, Paradise Valley, AZ (US); Roger Cornwell, Chandler, AZ (US)

(73) Assignee: Soilworks, LLC, Chandler, AZ (US)

( * ) Notice: Subject to any disclaimer, the term of this patent is extended or adjusted under 35 U.S.C. 154(b) by 6 days.

(21) Appl. No.: 14/250,255

(22) Filed: Apr. 10, 2014

(51) Int. Cl.
*B05C 1/16* (2006.01)
*C09K 3/22* (2006.01)
*B05D 5/00* (2006.01)

(52) U.S. Cl.
CPC .... *C09K 3/22* (2013.01); *B05D 5/00* (2013.01)

(58) Field of Classification Search
CPC ..................................................... B05C 1/16
USPC ........................................................ 427/136
See application file for complete search history.

(56) References Cited

U.S. PATENT DOCUMENTS

| | | | |
|---|---|---|---|
| 4,941,924 A | 7/1990 | Merritt | |
| 5,559,166 A | 9/1996 | Bearden | |
| 6,008,164 A | 12/1999 | Aldrich et al. | |
| 6,059,955 A | 5/2000 | Cody et al. | |
| 6,080,301 A | 6/2000 | Berlowitz et al. | |
| 6,090,989 A | 7/2000 | Trewella et al. | |
| 6,096,940 A | 8/2000 | Wittenbrink et al. | |
| 6,103,099 A | 8/2000 | Wittenbrink et al. | |
| 6,165,949 A | 12/2000 | Berlowitz et al. | |
| 6,332,974 B1 | 12/2001 | Wittenbrink et al. | |
| 6,410,488 B1 | 6/2002 | Fefer et al. | |
| 6,475,960 B1 | 11/2002 | Berlowitz et al. | |
| 6,599,864 B1 | 7/2003 | Bertomeu | |
| 7,067,049 B1 | 6/2006 | Baillargeon et al. | |
| 7,074,266 B2 * | 7/2006 | Hawkins et al. | 106/285 |
| 7,081,270 B2 | 7/2006 | Hawkins et al. | |
| 8,048,333 B2 | 11/2011 | Vitale et al. | |
| 8,070,980 B2 | 12/2011 | Vitale et al. | |
| 8,177,997 B2 | 5/2012 | Vitale | |
| 8,313,668 B2 | 11/2012 | Vitale et al. | |
| 2011/0229269 A1 | 9/2011 | Vitale et al. | |
| 2013/0025513 A1* | 1/2013 | Aradi et al. | 110/341 |

(Continued)

FOREIGN PATENT DOCUMENTS

| | | |
|---|---|---|
| EP | 0668342 | 8/1995 |
| EP | 0776959 | 6/1997 |
| WO | 97/08390 | 3/1997 |

OTHER PUBLICATIONS

Office Action dated May 28, 2014, the U.S. Appl. No. 14/250,230, filed Apr. 10, 2014.

(Continued)

*Primary Examiner* — Dah-Wei D Yuan
*Assistant Examiner* — Nga Leung V Law
(74) *Attorney, Agent, or Firm* — Hovey Williams LLP

(57) ABSTRACT

Dust suppressant compositions and methods of suppressing dust and other suspendable particulates are described herein that are able to treat a wide array of surfaces. In particular, the dust suppressant compositions can comprise at least one synthetic fluid that was previously derived from a Gas-to-Liquids process. Furthermore, the dust suppressant compositions can also comprise binders and other additives to customize the compositions for their intended application.

25 Claims, 1 Drawing Sheet

(56) References Cited

U.S. PATENT DOCUMENTS

| | | |
|---|---|---|
| 2013/0140486 A1 | 6/2013 | Vitale et al. |
| 2014/0138573 A1 | 5/2014 | Vitale et al. |
| 2014/0140767 A1 | 5/2014 | Vitale et al. |
| 2014/0140771 A1 | 5/2014 | Vitale et al. |
| 2014/0140774 A1 | 5/2014 | Vitale et al. |
| 2014/0140775 A1 | 5/2014 | Vitale et al. |

OTHER PUBLICATIONS

Detloff, Cheryl "Synthetic-Based Fluid Versus Oil Dust Suppressants" Midwest Industry Supply, Inc., disclosure material, Jun. 12, 2012.

Material Safety Data Sheet for Dust Suppressant Fluid 65, Petro-Canada, Oct. 21, 2013, http://lubricants.petro-canada.ca/resource/download.aspx?type=MSDS&iproduct=714&language=en&region=CA.

Material Safety Data Sheet for 50 Neutral Light Basestock, Petro-Canada, Apr. 5, 2012, http://www.online.petro-canada.ca/datasheets/en_CA/n50lht.pdf.

Material Safety Data Sheet for EK35 by the Midwest Industrial Supply, Inc., Jun. 2, 2011.

Material Safety Data Sheet for EnviroKleen produced by the Midwest Industrial Supply Inc. Mar. 24, 2011.

"Stop Dust in Its Tracks" Brochure Midwest Industrial Supply, Inc. Feb. 18, 2005.

EK35 Brochure, International Consulting Group, Inc. Aug. 24, 2007.

"What is a Synthetic? Depends on Whom You Ask" Midwest Industrial Supply, Inc., www.midwestind.com. Oct. 3, 2011.

TechData for Dust Suppressant Fluid DSF 65, Petro-Canada, http://lubricants.petro-canada.ca/resource/download.aspx?type=TechData&iproduct=714&language= Sep. 8, 2011.

Mine Road Stabilization Brochure EK35 produced by Midwest Industrial Supply, Inc., Jun. 16, 2003.

Material Safety Data for EK35 Synthetic Organic Dust Control produced by Midwest Industrial Supply Inc., Feb. 19, 2003.

EnviroKleen—Clean Air for Underground Mining Brochure produced by the Midwest Industrial Supply, Inc. Jun. 16, 2003.

"When It Comes to Controlling Dust Ultra-Pure EnviroKleen is the Answer to Your Prayers" produced by Midwest Industrial Supply, Inc., Sep. 29, 2003.

* cited by examiner

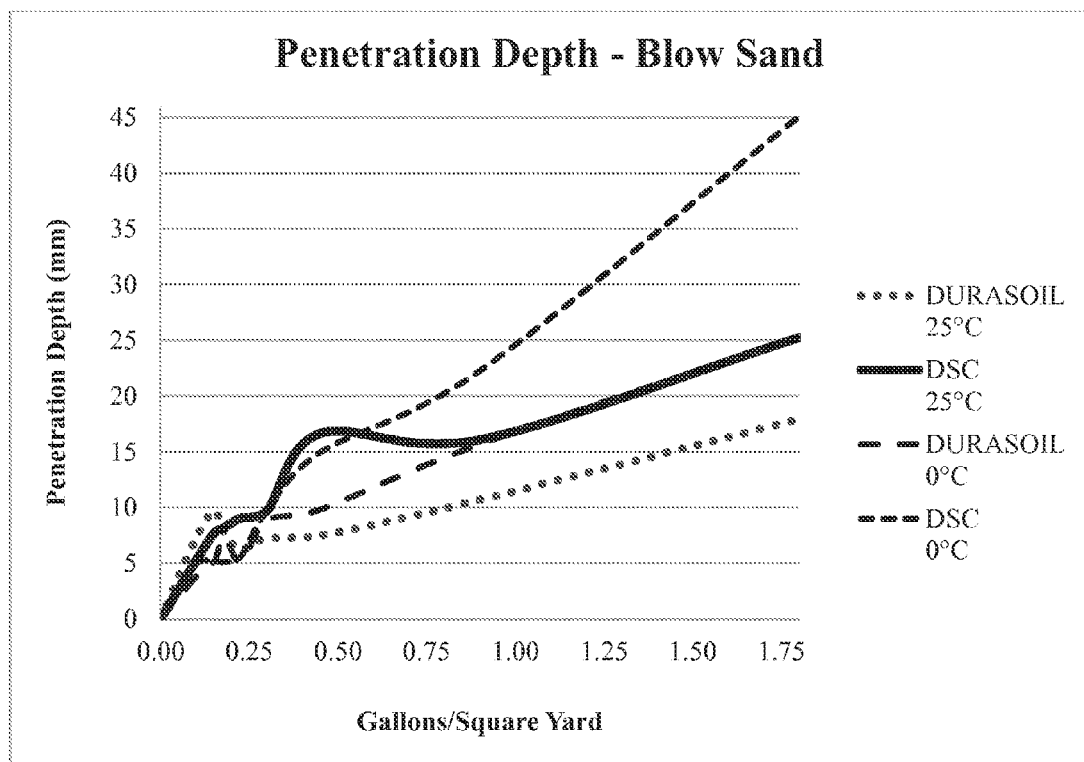

DUST SUPPRESSION COMPOSITION AND METHOD OF CONTROLLING DUST

BACKGROUND

1. Field of the Invention

The present invention is generally directed to dust suppressant compositions capable of suppressing dust and other suspendable particulates. More particularly, the present invention is generally related to dust suppressant compositions that can comprise a synthetic fluid derived from natural gas.

2. Description of the Related Art

Dust and other suspendable particulates can be the source of many problems throughout the world today. For example, uncontrolled dust and other suspendable particulates can cause erosion of fine soils, negatively impact human health, raise safety concerns via reduced visibility, and negatively affect the environment and certain ecological niches. Many different dust suppressants have been utilized in the past to address these issues and suppress the negative effects associated with uncontrolled dust and other suspendable particulates. These conventional dust suppressants have included, for example, water, water-absorbing products, organic petroleum products, organic nonpetroleum products, biomass-derived products, electrochemical products, clay additives, and synthetic polymers. However, many of these conventional dust suppressants lack durability, offer only short term effectiveness, or can negatively affect the environment in which they are implemented.

Thus, there is a need for a dust suppressant composition that can suppress dust and other suspendable particulates for extended periods of times and that is more environmentally friendly.

SUMMARY

One or more embodiments of the present invention concern a method for suppressing dust and other suspendable particulates. The method comprises applying a dust suppressant composition onto a surface to thereby form a dust suppressant coating. The dust suppressant composition comprises a synthetic fluid that comprises at least one acyclic aliphatic compound and at least one cyclic aliphatic compound.

One or more embodiments of the present invention concern a method for suppressing dust and other suspendable particulates. The method comprises applying a dust suppressant composition onto a surface to thereby form a dust suppressant coating. The dust suppressant composition consists essentially of a synthetic fluid that comprises at least one acyclic aliphatic compound and at least one cyclic aliphatic compound.

One or more embodiments of the present invention concern a treated surface comprising a dust suppressant layer formed thereon. The dust suppressant layer is formed by a dust suppressant composition comprising a synthetic fluid containing at least one acyclic aliphatic compound and at least one cyclic aliphatic compound.

BRIEF DESCRIPTION OF THE FIGURE

Embodiments of the present invention are described herein with reference to the following drawing FIGURE, wherein:

FIG. 1 is a graph comparing the penetration depths of the inventive dust suppressant composition and Durasoil® dust suppressant (SOILWORKS) in sand.

DETAILED DESCRIPTION

The present invention is generally related to dust suppressant compositions capable of suppressing dust and other suspendable particulates. Suppressing dust and other suspendable particulates can be desirable in many different industries since unregulated and uncontrolled dust can cause numerous issues. The dust suppressant composition described herein can be considered a safe, virtually non-toxic composition that is capable of reducing the generation of airborne and suspended particulate matter on various surface types. Unlike other dust suppressants, the dust suppressant compositions described herein can be applied in undiluted form, can remain active over long periods of time, can be insoluble in water, and can contain no electrolytes.

More specifically, the dust suppressant compositions described herein can be used to: stabilize soil, suppress dust and other suspendable particulates, and control erosion. For example, the dust suppressant compositions can be used to: stabilize soil in order to create roads, runways, and parking lots; control dust and other particulates in industrial facilities, agricultural facilities, and manufacturing facilities; and/or control erosion and dust for existing roads, recreational paths, runways, trails, equestrian arenas, helicopter landing pads, intermodal yards, parking lots, and other landscaping features.

Synthetic Fluids for the Dust Suppressant Compositions

The dust suppressant compositions described herein can comprise, consist essentially of, or consist of a synthetic fluid. In various embodiments, the dust suppressant composition can comprise at least 1, 5, 10, 20, 40, 60, 80, 90, 95, or 99 weight percent of the synthetic fluid. As used herein, "synthetic" means that the relevant fluid has undergone at least some chemical transformation during its production. Thus, this would exclude materials that have only been subjected to a simple purification or separation process that does not alter the chemical composition of the material.

The synthetic fluids can be in the form of a vapor, liquid, or a mixture thereof. In certain embodiments, the synthetic fluid is in a liquid phase. In various embodiments, the synthetic fluids are produced using a Gas-to-Liquids ("GTL") process. The GTL process is a process for converting natural gas into synthetic fluids. Due to the GTL process, the resulting synthetic fluids can be extremely pure and virtually free of various contaminants, such as nitrogen, metals, and sulfur. In certain embodiments, the synthetic fluids can comprise a synthetic hydrocarbon fluid.

The GTL process generally involves: (1) carrying a natural gas to a processing facility; (2) separating water and other byproducts from the natural gas; (3) introducing the pure natural gas into a gasification reactor, wherein the natural gas is mixed with oxygen and is converted into synthesis gas; (4) introducing the synthesis gas into a reactor wherein a catalyst converts the gas into long-chain waxy hydrocarbons and water; (5) cracking the long-chain hydrocarbons in a cracker with hydrogen in order to produce shorter hydrocarbons; and (6) distilling the cracked hydrocarbon products into various liquids products having different boiling points.

The GTL process is further described in PCT Application Publication No. WO 02/070631, the entire disclosure of which is incorporated herein by reference in its entirety. In addition, synthetic fluids are also described in European Patent No. EP0668342, European Patent No. EP0776959; U.S. Pat. No. 6,008,164; U.S. Pat. No. 6,059,955; U.S. Pat. No. 6,080,301; U.S. Pat. No. 6,090,989; U.S. Pat. No. 6,096,940; U.S. Pat. No. 6,103,099; U.S. Pat. No. 6,165,949; U.S. Pat. No. 6,332,974; U.S. Pat. No. 6,475,960; U.S. Pat. No. 6,599,864; and U.S. Pat. No. 7,067,049, the disclosures of which are incorporated herein by reference in their entireties.

Compared to conventional petroleum-based fluids used previously in dust suppression, GTL synthetic fluids generally have a more uniform chemical structure, which can allow for a more consistent performance when applied in the field.

The composition of the synthetic fluids can vary depending on the surface intended to be treated and the properties desired in the dust suppressant compositions. In various embodiments, the synthetic fluid can comprise, consist essentially of, or consist of at least one acyclic aliphatic compound and/or at least one cyclic aliphatic compound. For example, the synthetic fluid can comprise at least 25, 50, 60, 75, 85, 90, 95, or 99 weight percent of one or more acyclic aliphatic compounds. Additionally or alternatively, the synthetic fluid can comprise at least 0.1, 0.5, 1, or 3 and/or not more than 75, 60, 45, or 35 weight percent of one or more cyclic aliphatic compounds. More particularly, the synthetic fluid can comprise in the range of 0.1 to 75, 0.5 to 60, 1 to 45, or 3 to 35 weight percent of one or more cyclic aliphatic compounds. As used herein, "aliphatic" refers to a compound that is composed of carbon and hydrogen.

Furthermore, in various embodiments, at least 15, 25, 40, 65, 80 or 90 percent of the acyclic aliphatic compounds by weight can have a carbon chain length in the range of $C_{24}$ to $C_{36}$. Additionally or alternatively, at least 15, 25, 40, 65, 80 or 90 percent of the cyclic aliphatic compounds by weight can have a carbon chain length in the range of $C_{24}$ to $C_{36}$.

In one or more embodiments, the acyclic aliphatic compound can comprise at least one linear alkane, branched alkane, or a combination thereof. As used herein, an "alkane" refers to an aliphatic compound that only contains single bonds. Additionally or alternatively, the cyclic aliphatic compound can comprise at least one cycloalkane, alicyclic compound, or a combination thereof. As used herein, an "alicyclic compound" is a compound that comprises a cycloalkane component and a linear or branched alkane component. In certain embodiments, the synthetic fluid useful in the dust suppressant compositions can comprise, consist essentially of, or consist of linear alkanes, branched alkanes, cycloalkanes, and/or alicyclic compounds.

Furthermore, in various embodiments, the acyclic aliphatic compounds and/or the cyclic aliphatic compounds can be saturated. For example, at least 75, 80, 85, 90, 95, or 99 percent of the acyclic aliphatic compounds and/or the cyclic aliphatic compounds can be saturated as measured according to ASTM D2007.

In various embodiments, the alicyclic compound can comprise branched alkanes having at least one cyclic hydrocarbon ring, linear alkanes having at least one cyclic hydrocarbon ring, or a combination thereof. In certain embodiments, the alicyclic compounds can comprise dimethyl-branched alkanes with cyclopentyl and/or cyclohexyl rings.

In various embodiments, the synthetic fluid useful for the dust suppressant compositions can comprise at least 50, 60, 75, 85, 90, 95, 99, or 99.9 weight percent of one or more linear alkanes, branched alkanes, cycloalkanes, alicyclic compounds, or combinations thereof.

In various embodiments, the synthetic fluid can comprise one or more branched alkanes have at least one methyl branch. In certain embodiments, the synthetic fluid can comprise at least 1, 5, 10, or 15 and/or not more than 75, 60, 50, or 35 weight percent of at least one methyl-branched alkane. More particularly, the synthetic fluid can comprise in the range of 1 to 75, 5 to 60, 10 to 50, or 15 to 35 weight percent of at least one methyl-branched alkane. Furthermore, in certain embodiments, the synthetic fluid can comprise at least 1, 5, 15, or 30 and/or not more than 95, 80, 70, or 55 weight percent of at least one dimethyl-branched alkane. More particularly, the synthetic fluid can comprise in the range of 1 to 95, 5 to 80, 15 to 70, or 30 to 55 weight percent of at least one dimethyl-branched alkane. Additionally or alternatively, the synthetic fluid can comprise at least 1, 5, 10, or 15 and/or not more than 75, 60, 45, or 30 weight percent of at least one trimethyl-branched alkane. More particularly, the synthetic fluid can comprise in the range of 1 to 75, 5 to 60, 10 to 45, or 15 to 30 weight percent of at least one trimethyl-branched alkane.

Moreover, in certain embodiments, the synthetic fluid can comprise at least 0.1, 0.5, 1, or 5 and/or not more than 75, 60, 45, or 35 weight percent of at least one dimethyl-branched alkane with a cyclopentyl ring and/or a cyclohexyl ring. More particularly, the synthetic fluid can comprise in the range of 0.1 to 75, 0.5 to 60, 1 to 45, or 5 to 35 weight percent of at least one dimethyl-branched alkane with a cyclopentyl ring and/or a cyclohexyl ring.

In certain embodiments, the synthetic fluid can comprise a commercially-available synthetic fluid, such as the Shell Risella X series from ROYAL DUTCH SHELL including, for example, Shell Risella X 415, Shell Risella X 420, or Shell Risella X 430. In one or more embodiments, the synthetic fluids can comprise compounds from CAS No. 848301-69-9, CAS No. 1262661-88-0, or a combination thereof.

As noted above, since the GTL synthetic fluids can be derived from synthesis gases, which have been previously purified, the resulting GTL synthetic fluids can also have a high purity. For example, the synthetic fluids can comprise less than 10, 5, 3, 1, or 0.5 weight percent of aromatics as measured using chromatography and mass spectroscopy. Furthermore, the synthetic fluids can comprise less than 5, 3, 1, or 0.5 weight percent of nitrogen. Moreover, the synthetic fluids can comprise less than 5, 3, 1, or 0.5 weight percent of sulfur as measured according to ISO 14596.

In addition, the synthetic fluids can exhibit various properties as described below that can influence and/or enhance the functionality of the dust suppressant compositions.

In one or more embodiments, the synthetic fluids can have lower viscosities compared to conventional mineral oils, such as paraffinic and naphthenic process oils that are commonly used in the art. Consequently, this can lead to performance advantages when utilized in the dust suppressant compositions.

Viscosity can be an important property in the dust suppressant compositions. For example, if the dust suppressant composition is too thin, then it may not form an effective coating on the surface upon application. In particular, if the viscosity is too low, the composition may not sufficiently coat the dust and other suspendable particulates on the surface. Consequently, the dust and other suspendable particulates may not be adequately weighed down and, therefore, would still be capable of becoming airborne. Furthermore, if viscosity is too low, the dust suppressant composition can continue to leach and penetrate into the porous surface, thereby leaving the top surface layer insufficiently coated.

Alternatively, if the dust suppressant composition is too viscous, then it may be difficult to apply using conventional spray equipment. Furthermore, too high of a viscosity can also inhibit penetration of a porous surface. Consequently, the highly-viscous composition can agglomerate on the treated surface, thereby making the surface potentially slippery and a possible hazard. Moreover, without proper penetration, the dust suppressant composition may be easily removed when exposed to water since the composition can be less dense than water, which can cause the applied composition to float away.

In various embodiments, the synthetic fluids can have a kinematic viscosity at 40° C. of at least 0.5, 5, or 40 and/or not more than 120, 80, or 55 mm$^2$/s as measured according to ASTM D445. More particularly, the synthetic fluids can have a kinematic viscosity at 40° C. in the range of 0.5 to 120, 5 to 80, or 40 to 55 mm$^2$/s as measured according to ASTM D445. Additionally or alternatively, the synthetic fluids can have a viscosity index of at least 25, 50, or 100 and/or not more than 200, 150, or 140 as measured according to ISO 2909. More particularly, the synthetic fluids can have a viscosity index in the range of 25 to 200, 50 to 150, or 100 to 140 as measured according to ISO 2909.

In various embodiments, the synthetic fluids can have a dynamic viscosity at 0° C. of at least 1, 30, or 65 and/or not more than 2,000, 1,000, or 125 cP as measured according to ASTM D445. More particularly, the synthetic fluids can have a dynamic viscosity at 0° C. in the range of 1 to 2,000, 30 to 1,000, or 65 to 125 cP as measured according to ASTM D445. Furthermore, in certain embodiments, the synthetic fluids can have a dynamic viscosity at 20° C. of at least 1, 10, or 30 and/or not more than 2,000, 500, or 75 cP as measured according to ASTM D445. More particularly, the synthetic fluids can have a dynamic viscosity at 20° C. in the range of 1 to 2,000, 10 to 500, or 30 to 75 cP as measured according to ASTM D445. Moreover, in certain embodiments, the synthetic fluids can have a dynamic viscosity at 40° C. of at least 0.5, 1, or 10 and/or not more than 2,000, 250, or 30 cP as measured according to ASTM D445. More particularly, the synthetic fluids can have a dynamic viscosity at 40° C. in the range of 0.5 to 2,000, 1 to 250, or 10 to 30 cP as measured according to ASTM D445.

In one or more embodiments, the synthetic fluids can have lower densities compared to paraffinic process oils and naphthenic process oils that are commonly used in the art. Consequently, this can lead to performance advantages when utilized in the dust suppressant compositions. For example, in various embodiments, the synthetic fluids can have a density at 15° C. of at least 400, 600, or 800 and/or not more than 900, 875, or 840 kg/m$^3$ as measured according to ISO 12185. More particularly, the synthetic fluids can have density in the range of 400 to 900, 600 to 875, or 800 to 840 kg/m$^3$ as measured according to ISO 12185. Furthermore, in various embodiments, the synthetic fluids can have a specific gravity of at least 0.75, 0.8, or 0.85 and/or not more than 0.95, 0.92, or 0.88 as measured according to ASTM D1298. More particularly, the synthetic fluids can have a specific gravity in the range of 0.75 to 0.95, 0.8 to 0.92, or 0.85 to 0.88 as measured according to ASTM D1298.

In one or more embodiments, the synthetic fluids can exhibit desirable volatility properties that are suited for use in suppressing dust and other suspendable particulates. In various embodiments, the synthetic fluids can have a boiling point of at least 100, 150, or 175 and/or not more than 800, 500, or 300° C. More particularly, the synthetic fluids can have a boiling point in the range of 100 to 800° C., 150 to 500° C., or 175 to 300° C.

In various embodiments, the synthetic fluids can have a flash point of at least 150, 175, or 200° C. and/or not more than 325, 300, or 275° C. as measured according to ISO 2592. More particularly, the synthetic fluids can have a flash point in the range of 150 to 325° C., 175 to 300° C., or 200 to 275° C. as measured according to ISO 2592. Furthermore, in various embodiments, the synthetic fluids can have a pour point of no lower than −100, −75, or −50° C. and/or not higher than 0, −10, or −20° C. as measured according to ISO 3016. More particularly, the synthetic fluids can have a pour point in the range of −100 to 0° C., −75 to −10° C., or −50 to −20° C. as measured according to ISO 3016. The pour point of the dust suppressant composition can be an important property, especially when the composition is utilized in arctic (i.e., freezing) conditions. By containing a desirable pour point, the dust suppressant compositions can be applied under conditions wherein most water-based products would freeze.

Additionally or alternatively, the synthetic fluids can comprise a NOACK volatility at 250° C. for 1 hour of not more than 100, 75, 60, or 45 percent as measured according to ASTM D972. Moreover, in various embodiments, the synthetic fluids can have an aniline point of at least 35, 80, or 110° C. and/or not more than 205, 175, or 125° C. as measured according to ASTM D611. More particularly, the synthetic fluids can have an aniline point in the range of 35 to 205° C., 80 to 175° C., or 110 to 125° C. as measured according to ASTM D611.

In one or more embodiments, the synthetic fluids can be biodegradable and exhibit other properties that make the resulting dust suppressant compositions more desirable for use in a wide array of environments. For example, the synthetic fluids can have a dielectric strength of at least 15, 25, or 45 and/or not more than 100, 75, or 50 as measured according to ASTM D877. More particularly, the synthetic fluids can have a dielectric strength in the range of 15 to 100, 25 to 75, or 45 to 50 as measured according to ASTM D877. In certain embodiments, the synthetic fluid is not flammable according to the UN GHS criteria. Moreover, in various embodiments, the synthetic fluid is neither self-reactive nor self-heating and will not undergo exothermic decomposition when heated.

Furthermore, in various embodiments, the synthetic fluids can exhibit no change in hardness, coloration, or staining under the paint softening test (ASTM F502). In certain embodiments, the synthetic fluids can exhibit no failure under the hydrogen embrittlement test (ASTM F519-93).

In one or more embodiments, the synthetic fluids can exhibit and maintain desirable coloring suitable for use in the dust suppressant composition. For example, the synthetic fluids can have an ASTM Color of less than 3, 2, or 1 as measured according to ASTM D1500. Additionally or alternatively, the synthetic fluids can have a Saybolt Color of less than 60, 50, or 35 as measured according to ASTM D156.

In one or more embodiments, the synthetic fluids can be insoluble in water due to their hydrophobic composition. This can allow the synthetic fluids to resist rain and other aqueous influences that could negatively affect the long term stability of the dust suppressant composition.

It should be noted that the above recited properties of the synthetic fluids can also apply to the dust suppressant compositions, especially in embodiments where the dust suppressant compositions can consist entirely of the synthetic fluids.

Binders and Additives for the Dust Suppressant Compositions

In addition to the synthetic fluids, the dust suppressant compositions described herein can comprise one or more binders. The binders can have multiple functions in the dust suppressant composition. For example, the binders can help the dust suppressant composition adhere to the desired surface and can cause particulates of certain surfaces to agglomerate. Furthermore, in certain embodiments, the synthetic fluids can function as plasticizers for the binders. In one or more embodiments, the dust suppressant composition can comprise at least 1, 5, 10, or 20 and/or not more than 95, 75, 50, or 30 weight percent of one or more binders. More particularly, the dust suppressant composition can comprise in the range of 1 to 95, 5 to 75, 10 to 50, or 20 to 30 weight percent of one or more binders.

In various embodiments, the binders can comprise at least one compound containing a carboxylic acid or a derivative thereof. In certain embodiments, the binders can comprise a compound containing a carboxylic acid. In one or more embodiments, the dust suppressant composition can comprise at least 1, 5, 10, or 20 and/or not more than 95, 75, 50, or 30 weight percent of at least one compound containing a carboxylic acid or a derivative thereof. More particularly, the dust suppressant composition can comprise in the range of 1 to 95, 5 to 75, 10 to 50, or 20 to 30 weight percent of at least one compound containing a carboxylic acid or a derivative thereof. Additionally, in certain embodiments, the compound containing a carboxylic acid can be a tall pitch oil.

In one or more embodiments, the dust suppressant compositions can comprise little to no compounds having carboxylic acids. For example, in certain embodiments, the dust suppressant compositions can comprise less than 5, 3, 1, or 0.5 weight percent of compounds having carboxylic acids.

In various embodiments, the binder can comprise at least one polyolefin, including, for example, thermoplastic polyolefins and elastomeric polyolefins. The polyolefins that can be incorporated into the dust suppressant compositions can include, for example, polyisobutylene, polyethylene, polypropylene, polymethylpentene, polybutene, ethylene propylene rubber, ethylene propylene diene monomer rubber, or combinations thereof. In certain embodiments, the polyolefin can comprise polyisobutylene. In one or more embodiments, the dust suppressant composition can comprise at least 1, 5, 10, or 20 and/or not more than 95, 75, 50, or 30 weight percent of at least one polyolefin. More particularly, the dust suppressant composition can comprise in the range of 1 to 95, 5 to 75, 10 to 50, or 20 to 30 weight percent of at least one polyolefin.

In various embodiments, the dust suppressant compositions can comprise at least one additive including, for example, fillers, sulfonates, viscosity modifiers, asphalt emulsions, or combinations thereof. In one or more embodiments, the dust suppressant compositions can comprise at least 0.5, 1, 3, or 5 and/or not more than 75, 50, or 25, or 10 weight percent of at least one additive. More particularly, the dust suppressant compositions can comprise in the range of 0.5 to 75, 1 to 50, 3 to 25, or 5 to 10 weight percent of at least one additive.

The dust suppressant compositions can be formed using any conventional mixers known and utilized in the art. For example, in embodiments where the dust suppressant composition comprises multiple components, these components may be combined using any conventional mixers such as, for example, high shear mixers, colloid mills, or any other mixing apparatus known in the art.

The components forming the dust suppressant composition can be mixed together at room temperature or under heated conditions in order to form the dust suppressant compositions. For example, in certain embodiments, the components forming the dust suppressant composition can be blended at a temperature in the range of 15 to 250° C., 35 to 200° C., or 45 to 175° C. until a consistent mixture is obtained.

The dust suppressant compositions produced in accordance with the above can be insoluble in water. Furthermore, the dust suppressant compositions described herein can exhibit a sandwich corrosion test score of not more than 2, or not more than 1, as measured according to ASTM F1110. Additionally or alternatively, the dust suppressant compositions can exhibit no crazing, cracking, or etching as measured via the acrylic crazing test (ASTM F484).

Methods for Suppressing Dust and Other Suspendable Particulates

The dust suppressant composition may be applied using any conventional equipment known in the art capable of spraying or dispersing a fluid. For example, this can include gravity fed pumps, pneumatic sprayers, pump hoses, asphalt grinders, motor graders, pug mills, compactors, and rollers. In various embodiments, the dust suppressant compositions do not need to be diluted prior to application.

In various embodiments, the surface to be treated by the dust suppressant composition can comprise, for example, soil, sand, coal, clays, seeds, grains, metals, plastics, materials processed with industrial equipment, materials processed with manufacturing equipment, materials processed by agricultural equipment, roadways, landscaping, runways, parking lots, or any other surface that can be negatively affected by or produce dust and other suspendable particulates. In certain embodiments, the surface to be treated can be porous and/or comprise a plurality of particulates.

Application rates of the dust suppressant composition can vary depending on the surface to be treated. For example, the weight and/or frequency of traffic, thickness of dust-causing layer, climate, rainfall, and porosity of the treated surface can be considered. In various embodiments, the dust suppressant composition can be applied to a surface at a rate of at least 0.001, 0.01, 0.05, 0.1, or 0.2 and/or not more than 10, 8, 7, 6, or 4 gallons per square yard. More particularly, the dust suppressant composition can be applied to a surface at a rate in the range of 0.001 to 10, 0.01 to 8, 0.05 to 7, 0.1 to 6, or 0.2 to 4 gallons per square yard.

Once the dust suppressant composition has been applied onto the selected surface, it can be allowed to form a coating thereon and, in embodiments where the surface is porous, at least partially penetrate the surface. During this time, at least a portion of the composition can be absorbed and/or bind to the particulate material forming the surface. As one skilled in the art would appreciate, the dust suppressant composition can only penetrate the treated surface if the surface is porous. Examples of porous surfaces can include soil, sand, seeds, clays, and coal.

The penetration depth of the dust suppressant composition into a porous surface can be largely influenced by the type of surface that the composition is applied to, the amount of time that the composition has been allowed to penetrate the porous surface, the temperature of the environment, and the amount of the composition applied onto the surface. In certain embodiments, upon contacting the surface, the dust suppressant composition can act as a liquid and agglomerate on the surface, but not evaporate. Consequently, the dust suppressant composition can form a coating on the treated surface. In one or more embodiments, the dust suppressant coating can form a set coating on the surface at 25° C. upon application in less than 60, 45, 30, 15, or 5 seconds.

The dust suppressant compositions described herein can efficiently penetrate a porous surface at room temperature over a 24 hour period depending on various variables, which can include, for example, the viscosity of the composition, the application rate of the composition, the permeability of the surface, and the water saturation of the medium. In various embodiments, the dust suppressant composition can obtain a penetration depth within a porous surface at 25° C. of at least 2, 5, 10, or 15 mm and/or not more than 500, 300, 200, or 150 mm over a 24 hour period. More particularly, the dust suppressant composition can obtain a penetration depth within a porous surface at 25° C. in the range of 2 to 500 mm, 5 to 300 mm, 10 to 200 mm, or 15 to 150 mm over a 24 hour period.

Furthermore, the dust suppressant compositions described herein can also efficiently penetrate a porous surface at freezing temperatures. For example, the dust suppressant compositions can obtain a penetration depth within a porous surface at 0° C. of at least 2, 5, 10, or 15 and/or not more than 500, 300, 200, or 150 mm over a 24 hour period. More particularly, the dust suppressant compositions can obtain a penetration depth within a porous surface at 0° C. in the range of 2 to 500 mm, 5 to 300 mm, 10 to 200 mm, or 15 to 150 mm over a 24 hour period. It should be noted that the above penetration depths can be measured using a metric digital caliper.

Accordingly, the dust suppressant compositions described herein can exhibit functionality and durability at common application temperatures.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

In this example, the penetration ability of an inventive dust suppressant composition was compared to Durasoil® from SOILWORKS. The inventive dust suppression composition was formed entirely from Shell Risella X 420 from ROYAL DUTCH SHELL. The purpose of this comparison was to compare the abilities of these compositions to penetrate sand over a 24 hour period as measured with a metric digital caliper.

Blow sand was used as the testing medium, which was chosen due to its consistency in sand grain size. The sand was placed in 18 separate 12"×12"×7" square test boxes, which were allowed to sit for 24-48 hours to allow the sand to settle. One box in each study was left untreated to serve as a control. The dust suppressant compositions were either cooled to 0° C. for 24 hours or maintained at room temperature (25° C.) for the testing.

Application rates were varied and based on gallons per square yard. In order to guarantee consistency during the application process, a semi-automated pneumatic spray machine was used to apply the compositions. This spray machine was operated and regulated through the use of air pressure. Application amounts were calculated by determining the number of spraying passes and flow rate necessary to achieve the desired distribution amount.

Penetration depths after 24 hours were measured at each application rate noted in Table 1, below, for the inventive dust suppressant composition ("Inventive DSC") and Durasoil®. The penetration depths were measured by making a diagonal cut through the surface layer of the treated boxes and measuring the depth with a metric digital caliper. Table 1 and FIG. 1 depict the penetration depths for each sample at 0° C. and 25° C.

TABLE 1

| Gallons/ | Penetration Depth (mm) | | | |
| --- | --- | --- | --- | --- |
| Square Yard | Inventive DSC (25° C.) | Durasoil® (25° C.) | Inventive DSC (0° C.) | Durasoil® (0° C.) |
| 0.100 | 5.24 | 7.26 | 4.95 | 3.8 |
| 0.150 | 7.64 | 9.69 | 5.13 | 5.09 |
| 0.180 | 8.2 | 7.765 | 5.1 | 7.36 |
| 0.225 | 9.04 | 6.22 | 5.56 | 5.15 |
| 0.300 | 9.73 | 7.27 | 9.74 | 8.85 |
| 0.450 | 16.64 | 7.48 | 14.93 | 9.81 |
| 0.900 | 16.07 | 10.68 | 22.25 | 15.66 |
| 1.800 | 25.23 | 17.91 | 45.03 | 25.28 |

As shown in Table 1 and FIG. 1, the inventive dust suppressant composition generally had superior penetration depths at 0° C. and 25° C. compared to Durasoil® and, in some cases, required less of the composition to be applied in order to obtain the desired penetration depths.

Example 2

In this example, dust suppressant compositions were produced by combining varying amounts of Shell Risella X 420 from ROYAL DUTCH SHELL with a polyisobutylene ("PIB") (TPC polyisobutylene 1160 from TEXAS PETROCHEMICALS) or a tall pitch oil (TALLEX® LA-95 from MEADWESTVACO CORPORATION). The components forming the dust suppressant compositions were combined, heated, and mixed at 180° F. (82° C.). The dust suppressant compositions were then subjected to the sand penetration tests at 25° C. as previously described in Example 1, except that each composition was applied at a constant rate of 30 square feet per gallon (0.33 gallons per square foot). Table 2, below, provides the compositional properties of the dust suppressant compositions (based on volume percentage) and their penetration depths in sand at 25° C. after 24 hours.

TABLE 2

| Composition | Risella X 420 (Volume %) | PIB (Volume %) | Tall Pitch Oil (Volume %) | Average Penetration Depth (mm) |
| --- | --- | --- | --- | --- |
| 1 | 100 | — | — | 9.73 |
| 2 | 90 | 10 | — | 3.99 |
| 3 | 80 | 20 | — | 5.29 |
| 4 | 70 | 30 | — | 8.24 |
| 5 | 60 | 40 | — | 12.11 |
| 6 | 50 | 50 | — | 9.03 |
| 7 | 40 | 60 | — | — |
| 8 | 30 | 70 | — | — |
| 9 | 20 | 80 | — | — |
| 11 | 90 | — | 10 | 7.37 |
| 12 | 80 | — | 20 | 7.11 |
| 13 | 70 | — | 30 | 9.21 |
| 14 | 60 | — | 40 | 5.54 |
| 15 | 50 | — | 50 | 3.95 |
| 16 | 40 | — | 60 | 3.20 |
| 17 | 30 | — | 70 | — |
| 18 | 20 | — | 80 | — |

As depicted in Table 2, the addition of polyisobutylene to the dust suppressant compositions in certain amounts can increase the sand penetration depths of the compositions. Furthermore, Table 2 also shows that the dust suppressant compositions can incorporate certain quantities of tall pitch oil and still exhibit sand penetration depths that are desirable.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A method for suppressing dust and other suspendable particulates, the method comprising applying a dust suppressant composition onto a surface to thereby form a dust suppressant coating;
    wherein the dust suppressant composition comprises a synthetic fluid comprising at least one acyclic aliphatic compound and at least one cyclic aliphatic compound,
    wherein the at least one acyclic aliphatic compound comprises one or more methyl-branched alkanes, one or more dimethyl-branched alkanes, and one or more trimethyl-branched alkanes, wherein the synthetic fluid comprises:
    5 to 75 weight percent of the one or more methyl-branched alkanes,
    5 to 70 weight percent of the one or more dimethyl-branched alkanes, and
    5 to 60 weight percent of the one or more trimethyl-branched alkanes.

2. The method of claim 1, wherein the applying comprises contacting the dust suppressant composition with the surface for sufficient time to allow the dust suppressant coating to form thereon.

3. The method of claim 1, wherein the cyclic aliphatic compound comprises at least one cycloalkane, alicyclic compound, or a combination thereof.

4. The method of claim 1, wherein the at least one cyclic aliphatic compound comprises one or more dimethyl-branched alkanes with cyclopentyl or cyclohexyl rings, wherein the synthetic fluid comprises in the range of 0.5 to 60 weight percent of the one or more dimethyl-branched alkanes with cyclopentyl or cyclohexyl rings.

5. The method of claim 1, wherein the synthetic fluid is derived from a Gas-to-Liquids ("GTL") process.

6. The method of claim 1, wherein the dust suppressant composition comprises at least one binder.

7. The method of claim 6, wherein the binder comprises a compound comprising a carboxylic acid or a polyolefin.

8. The method of claim 1, wherein the surface is a porous surface, wherein the dust suppressant coating exhibits a penetration depth within the porous surface in the range of 5 to 100 mm at 25° C. and over a 24 hour period.

9. The method of claim 1, wherein the surface is a porous surface, wherein the dust suppressant coating exhibits a penetration depth within the porous surface in the range of 5 to 100 mm at 0° C. and over a 24 hour period.

10. The method of claim 1, wherein the surface comprises a soil surface, a sand surface, a coal surface, a clay surface, a seed surface, a metal surface, or a plastic surface.

11. A method for suppressing dust and other suspendable particulates, the method comprising applying a dust suppressant composition onto a surface to thereby form a dust suppressant coating;
    wherein the dust suppressant composition consists essentially of a synthetic fluid comprising at least one acyclic aliphatic compound and at least one cyclic aliphatic compound,
    wherein the synthetic fluid is derived from a Gas-to-Liquids ("GTL") process,
    wherein a binder is absent in said dust suppressant composition.

12. The method of claim 11, wherein the dust suppressant composition consists of the synthetic fluid.

13. The method of claim 11, wherein the applying comprises contacting the dust suppressant composition with the surface for sufficient time to allow the dust suppressant coating to form thereon.

14. The method of claim 11, wherein the at least one acyclic aliphatic compound comprises at least one linear alkane, branched alkane, or a combination thereof, wherein the cyclic aliphatic compound comprises at least one cycloalkane, alicyclic compound, or a combination thereof.

15. The method of claim 14, wherein the at least one acyclic aliphatic compound comprises one or more methyl-branched alkanes, one or more dimethyl-branched alkanes, and one or more trimethyl-branched alkanes, wherein the synthetic fluid comprises:
    5 to 75 weight percent of the one or more methyl-branched alkanes;
    5 to 70 weight percent of the one or more dimethyl-branched alkanes; and
    5 to 60 weight percent of the one or more trimethyl-branched alkanes.

16. The method of claim 11, wherein the at least one cyclic aliphatic compound comprises one or more dimethyl-branched alkanes with cyclopentyl or cyclohexyl rings, wherein the synthetic fluid comprises in the range of 0.5 to 60 weight percent of the one or more dimethyl-branched alkanes with cyclopentyl or cyclohexyl rings.

17. The method of claim 11, wherein the surface is a porous surface, wherein the dust suppressant coating exhibits a penetration depth within the porous surface in the range of 5 to 100 mm at 25° C. and over a 24 hour period, wherein the dust suppressant coating exhibits a penetration depth within the porous surface in the range of 5 to 100 mm at 0° C. and over a 24 hour period.

18. The method of claim 11, wherein the surface comprises a soil surface, a sand surface, a coal surface, a clay surface, a metal surface, or a plastic surface.

19. A treated surface comprising a dust suppressant layer formed thereon;
   wherein the dust suppressant layer comprises a dust suppressant composition,
   wherein the dust suppressant composition comprises a synthetic fluid comprising at least one acyclic aliphatic compound and at least one cyclic aliphatic compound,
   wherein the at least one acyclic aliphatic compound comprises one or more methyl-branched alkanes, one or more dimethyl-branched alkanes, and one or more trimethyl-branched alkanes, wherein the synthetic fluid comprises:
   5 to 75 weight percent of the one or more methyl-branched alkanes,
   5 to 70 weight percent of the one or more dimethyl-branched alkanes, and
   5 to 60 weight percent of the one or more trimethyl-branched alkanes.

20. The treated surface of claim 19, wherein the dust suppressant composition consists of the synthetic fluid.

21. The treated surface of claim 19, wherein the cyclic aliphatic compound comprises at least one cycloalkane, alicyclic compound, or a combination thereof.

22. The treated surface of claim 19, wherein the at least one cyclic aliphatic compound comprises one or more dimethyl-branched alkanes with cyclopentyl or cyclohexyl rings, wherein the synthetic fluid comprises in the range of 0.5 to 60 weight percent of the one or more dimethyl-branched alkanes with cyclopentyl or cyclohexyl rings.

23. The treated surface of claim 19, wherein the synthetic fluid is derived from a Gas-to-Liquids ("GTL") process.

24. The treated surface of claim 19, wherein the dust suppressant composition comprises at least one binder.

25. The treated surface of claim 19, wherein the surface comprises a soil surface, a sand surface, a coal surface, a clay surface, a metal surface, or a plastic surface.

* * * * *